US006595325B2

(12) United States Patent
Ulrich (10) Patent No.: US 6,595,325 B2
(45) Date of Patent: Jul. 22, 2003

(54) TREE STAND WITH LEVEL ADJUSTMENT

(76) Inventor: Bruce E. Ulrich, R.D. #1, Box 118E, Middleburg, PA (US) 17842

( * ) Notice: Subject to any disclaimer, the term of this patent is extended or adjusted under 35 U.S.C. 154(b) by 45 days.

(21) Appl. No.: 09/943,323

(22) Filed: Aug. 31, 2001

(65) Prior Publication Data

US 2003/0042076 A1 Mar. 6, 2003

(51) Int. Cl.$^7$ ............................................. A63B 27/00
(52) U.S. Cl. ..................................... 182/136; 182/184
(58) Field of Search .......................... 297/217.7, 217.1; 248/218.4; 182/133–136, 187, 188, 116, 20; 108/152; D25/62

(56) References Cited

U.S. PATENT DOCUMENTS

| | | | |
|---|---|---|---|
| 3,485,320 A | | 12/1969 | Jones |
| 4,321,982 A | * | 3/1982 | Strickland ..................... 182/20 |
| 4,331,216 A | | 5/1982 | Amacker |
| 4,667,773 A | | 5/1987 | Davis |
| 4,726,447 A | * | 2/1988 | Gibson et al. .............. 182/135 |
| 4,909,353 A | * | 3/1990 | Govin et al. ................ 182/187 |
| 4,942,942 A | | 7/1990 | Bradley |
| 4,953,662 A | * | 9/1990 | Porter ........................ 182/135 |
| 4,987,972 A | * | 1/1991 | Helms ........................ 182/187 |
| 4,997,063 A | * | 3/1991 | Bradley ...................... 182/187 |
| 5,016,733 A | | 5/1991 | Bradley |
| 5,090,506 A | | 2/1992 | Womack et al. |
| 5,097,925 A | | 3/1992 | Walker, Jr. |
| 5,156,236 A | * | 10/1992 | Gardner ...................... 182/187 |
| 5,265,780 A | * | 11/1993 | Matthews et al. ...... 182/187 X |
| D347,481 S | | 5/1994 | Ashley et al. |
| 5,316,104 A | * | 5/1994 | Amacker ..................... 182/187 |
| 5,433,291 A | * | 7/1995 | Shoestock, Sr. ............. 182/20 |
| 5,458,215 A | | 10/1995 | Burgin |
| 5,641,036 A | * | 6/1997 | Maxwell ..................... 182/135 |
| 5,887,676 A | | 3/1999 | Harbin |
| 5,971,104 A | * | 10/1999 | Woller ........................ 182/136 |
| 5,996,738 A | * | 12/1999 | Nelsen ........................ 182/135 |

FOREIGN PATENT DOCUMENTS

| | | |
|---|---|---|
| CA | 1140447 | 2/1983 |
| CA | 1231686 | 1/1988 |
| CA | 2048501 | 9/1994 |

* cited by examiner

Primary Examiner—Daniel P. Stodola
Assistant Examiner—Hugh B. Thompson
(74) Attorney, Agent, or Firm—Richard C. Litman (57) ABSTRACT

A tree stand with level adjustment includes provision for scaling a tree, pole, or the like, for use by a hunter or wildlife observer or photographer, etc. The stand essentially comprises a lower foot rest component and an upper seating component, with each component having a peripheral frame defining a plane. A compressive tree brace member extends from each component and coplanar therewith, with a sloped upper frame member extending from each edge of each component. A flexible tensile member extends from each frame member of each component, for securing about the back of the tree. The tensile member is secured within one sloped member by an adjustably positionable pin for assembly, and within the opposite sloped member by a threaded adjuster for infinitesimally fine adjustment for precise leveling. The tree stand may also include foot rest and hand or arm rest extensions as desired.

14 Claims, 5 Drawing Sheets

TREE STAND WITH LEVEL ADJUSTMENT

BACKGROUND OF THE INVENTION

1. Field of the Invention

The present invention relates generally to the sport of hunting, and more particularly to equipment used in the hunting of large game animals. The present invention comprises a tree stand which includes means for ascending the tree without need for additional equipment, and means for leveling the two major components of the stand once they have been established in the tree as desired. The present tree stand may also be used for other sports and activities, e. g., bird and animal watching and photography, etc. as desired, and is operable upon any practicable tall and relatively narrow structure (poles, etc.).

2. Description of the Related Art

The hunting of large game, particularly deer, has become an increasingly popular activity for many people who enjoy the outdoors. Most wild animals for which hunting is legal are relatively shy and cautious, particularly of human presence. This is particularly true of animals which are commonly prey for other predators, with such prey animals generally developing keen senses of hearing, scent, and perhaps vision as well in order to sense potential predators with sufficient warning.

The above is particularly true of deer living in areas where hunting is legal. Even though the deer population is increasing in the U. S., it can be quite difficult to approach a deer sufficiently closely to get a killing shot when considering the difficulty of approach and the terrain, trees, brush, and other growth and factors, even with a rifle. The task is made even more challenging for archery hunters.

Accordingly, hunters have developed camouflage and various other aids in their cause. One factor which has been widely recognized for some time is that nearly all land animals tend to restrict their vision to a relatively narrow field close to the horizontal, and spend very little of their attention looking above the horizontal. This is particularly true of deer and similar herbivores, who have very few predators which strike from above. This has led to the development of the tree stand for hunters, which has provided several benefits for the hunter. Tree stands tend to elevate the hunter, removing him or her from the generally horizontal visual plane of most game animals. Such stands also provide additional camouflage for the hunter, by placing him/her closer to tree branches spreading horizontally from the tree at some distance above the ground. Tree stands also have the advantage of removing human scent from the surface, thereby removing a potential warning for the game animal. Accordingly, tree stands for hunting and other purposes (observation and photography of wild animals, etc.) have been known and used for quite some time.

However, stands used in the past have often been relatively crude affairs, failing to provide the refinement which can make the difference between a successful hunt and coming home empty handed. For example, many stands are sturdily built for durability and to provide a stable platform, but such construction results in their being difficult and/or cumbersome to carry into the woods and erect in a tree for the hunt. While some stand manufacturers have attempted to build relatively light weight stands, such stands are often not particularly durable, and are subject to failure and accident, particularly with larger and heavier hunters. One characteristic which is nearly universal for all stands of the prior art, is that it can be very difficult, or impossible, to arrange the stand so that its major components are level once set up in the tree. This can make a major difference in the comfort of the hunter or occupant of the stand, which in turn can lead to the success or failure of the hunt.

Accordingly, a need will be seen for a tree stand for hunters and others, which stand is constructed of lightweight yet sturdy materials for both durability and for the convenience of the user. The present stand essentially comprises a base or foot platform portion and a seating portion, with each including adjustable leveling means once set up in the tree. Padded seating, foot rest and gun rest extensions, and backpacking capability are also provided. A discussion of the related art of which the present inventor is aware, and its differences and distinctions from the present tree stand invention, is provided below.

U.S. Pat. No. 3,485,320 issued on Dec. 23, 1969 to T. V. Jones, titled "Portable Deer Stand," describes a conventional stand having a solid lower platform or foot rest and an upper frame which may include a seat extended laterally thereacross. Jones uses a series of threaded rods and other threaded components for securing the various components of his stand together. However, Jones fails to provide any form of adjusting these components to level the stand, once the stand has been secured to the tree. For example, the bight portion of each component, passing around the back of the tree from the major portion of the stand components, provides adjustment by means of threaded rods. However, these threaded rods are secured to the forwardmost edges of their respective components by pairs of clamping nuts at their extreme ends, which clamp about respective lugs on the stand frame members. No room for adjustment is provided, any loosening of the outermost nut would disassemble the structure. Wing nuts are used at the opposite ends of these members, to secure the internally threaded tubes in which the threaded rods are inserted, to the bight members of the components. However, no adjustment is provided at these ends; the wing nuts are only used for rapid assembly and disassembly in the field. Other threaded components are used between the forward and bight arms of each major component, but again, no adjustment is provided once the stand has been erected in the field. In contrast, the present tree stand provides easy adjustment of its major platform components after the stand has been secured to the tree and the hunter has ascended with the stand.

U.S. Pat. No. 4,331,216 issued on May 25, 1982 to Joseph A. Amacker, titled "Tree Climbing Stand," describes a conventional stand having a configuration similar to that of the Jones stand discussed immediately above. However, the Amacker stand is even simpler, in that only a limited number of adjustment holes are provided for connecting one end of the rearward gripping blade of each stand portion. Such adjustment cannot be performed once the Amacker stand is in place on the tree. Moreover, the Amacker stand uses relatively sharp tree engaging components which damage the tree, whereas the present tree stand engages the tree only with relatively blunt and/or resilient components which do not cut or damage the tree in any way.

U.S. Pat. No. 4,667,773 issued on May 26, 1987 to Tonnie Davis, titled "Portable Tree Stand," describes a single stand platform having a chain which wraps around the back of the tree, and a pair of compression brace arms which extend from each lower front corner of the stand to engage the tree at a single point beneath the stand. Davis does not provide any means for climbing the tree with his stand; it must be erected using other means. While Davis discloses a chain wrapped around the tree as the tension member supporting his stand, such a relatively coarse chain may only be adjusted to the nearest link, which may result in an inch or perhaps more of error from absolute level, depending upon the gauge of the chain. The present adjustable tree stand, with its infinitesimally adjustable threaded mechanism and climbing capability, provides considerable improvement over the Davis stand.

U.S. Pat. Nos. 4,942,942 and 5,016,733 issued respectively on Jul. 24, 1990 and May 21, 1991 to Ralph E. Bradley, each titled "Wedging Tree Stand," describe devices having a platform with a front compression brace extending therefrom to bear against the tree, and a relatively thin, flat bar extending around the back of the tree where its thin edge engages the back of the tree. Bradley provides leveling adjustment, but it is essentially opposite that of the present stand, with Bradley using an adjustable compression brace bearing against the front of the tree, rather than adjusting the upper member which passes around the tree, as in the present stand. Moreover, Bradley provides only a relatively limited number of adjustments due to a relatively few adjustment pin holes, rather than the more precise threaded adjustment of the present stand.

U.S. Pat. No. 5,090,506 issued on Feb. 25, 1992 to Cleve W. Womack et al., titled "Adjustable Hunter's Tree Stand," describes a stand member for use as a pair of identical stands, as in the Bradley stand described above. The present stand does not comprise identical upper and lower members, as in the Bradley and Womack et al. stands, but rather has a different structure for the upper and lower stand portions, for greater functionality of the present stand. Womack et al. uses a pair of threaded rods captured between corresponding opposed threaded lugs to each side of his stand, with each rod having a threaded nut disposed thereon. Each nut attaches to one end of the rearward tree engaging blade of the stand, with rotation of each threaded rod by a knob thereon resulting in adjustment of the tree engaging blade for different tree diameters. Womack et al. thus require adjustment of a threaded rod on each side of the stand and tree, in order to adjust the positioning and level of the stand uniformly. In contrast, the present stand includes a single coarse adjustment on one side of each stand portion, which is used as the connector for securing the stand around the tree and which provides coarse adjustment for the diameter of the tree. The coarse adjustment is not used once the stand has been erected in the tree. A threaded fine adjustment is provided on the opposite side of the present stand, with the hunter needing only to adjust the single fine adjustment on one side of each stand portion, to level the present stand.

U.S. Pat. No. 5,097,925 issued on Mar. 24, 1992 to George T. Walker, Jr., titled "Tree Walker," describes a device having conventional upper and lower portions with flexible cables wrapping around the back of the tree to secure to their respective frames. One end of each cable is fixed to its respective frame, and cannot be adjusted. The opposite end of each cable is adjustably secured in its respective frame member by a pin inserted into one of a series of holes through the frame member, generally as in the stand disclosed in the Amacker '216 U.S. Patent discussed further above. The same problem exists here, in that only a relatively few adjustments may be made, which may not be sufficient to provide absolute leveling of the stand components. It is also noted that Walker, and various other stands of the related art, use relatively sharp components to penetrate at least the bark of the tree. This is harmful to the tree, and is not permitted in many jurisdictions.

U.S. Pat. No. 5,433,291 issued on Jul. 18, 1995 to Richard F. Shoestock, Sr., titled "Combination Tree Stand And Wheeled Game Carrier," describes a somewhat large and heavy stand for performing both tasks indicated in the patent title. Due to the need for an axle and wheels, as well as the need to separate the game carrier into two components for use as upper and lower components of the tree stand, the Shoestock, Sr. carrier and stand is considerably heavier than the present stand assembly. Moreover, the adjustment provided is similar to that of the Amacker '216 U.S. Patent described further above, with Shoestock, Sr. failing to provide any infinitesimally fine adjustments for leveling his stand.

U.S. Pat. No. 5,458,215 issued on Oct. 17, 1995 to Robert C. Burgin, titled "Tree Stand Leveler," describes an add-on device for a conventional existing tree stand, rather than a stand having inherent level adjusting means, as provided by the present invention. The Burgin leveler attaches to the bottom of an existing stand platform and bears against the front of the tree, rather than the stand itself bearing against the tree. A threaded adjustment fitting passes through the adjuster, with an adjustment knob extending from the adjuster opposite the tree engaging portion of the device. The Burgin device would not be adaptable to many tree stands, including the present stand, as it extends across the center of the platform and thus would interfere with the upper seating portion of many platforms.

U.S. Pat. No. 5,887,676 issued on Mar. 30, 1999 to Daniel H. Harbin, titled "Accessory For Allowing Use Of A Tree Stand As A Game Carrier," describes additional components which may be removably secured to a specific tree stand structure, in order to use the tree stand as a game tote as well. Means are also provided for backpacking the folded assembly, including wheels, axle, and other game tote components. FIG. 4 of the drawings provides a side perspective view of the assembly installed in position as a tree stand, and discloses a series of holes along the sides of the upper diagonal components which extend to wrap around the back of the tree. However, no means for using these holes for adjustably positioning the stand for leveling the stand while the stand is installed on a tree, is apparent.

U.S. Pat. No. D-347,481 issued on May 31, 1994 to Jimmy Ashley et al., titled "Deer Stand," illustrates a design having differently configured upper and lower components. While the upper component includes a series of lateral holes formed in each of the two diagonals, it is unclear that these holes provide any form of level adjustment for the design. Even if such level adjustment were provided by selective insertion of pins through the holes, no infinitesimally adjustable threaded adjustment means is apparent in the Ashley et al. design. The disadvantage of relatively coarse adjustment means has been discussed further above, in various other utility patents of the related art.

Canadian Patent Publication No. 1,140,447 issued on Feb. 1, 1983 to Gary Cuba, titled "Tree-Mounted Deer Stand," describes a seat with a lower peripheral frame, with the frame including a series of inwardly oriented threaded clamps. The Cuba stand attaches to the top of a stump or the like with the seat directly above the stump, rather than surrounding at tree trunk. No means of scaling the tree using only the Cuba stand, is provided.

Canadian Patent Publication No. 1,231,686 issued on Jan. 19, 1988 to Ricky A. Purdy, titled "Deer Stand," describes a stand having foot rest and seating components, but the stand is not capable of use for climbing the tree without further ground support. The Purdy stand is an extension at the top of a ladder, which is used by the hunter to scale the tree and access the stand. While Purdy discloses an adjustable tree attachment comprising a chain which extends around the tree with a turnbuckle attachment, this does nothing to level the stand, as the opposite end of the stand is supported by the ladder. The only level adjustment for the stand is achieved by adjusting the angle of the ladder, with the ladder requiring an essentially vertical slope to place its stand portion essentially horizontal at the upper end thereof.

Finally, Canadian Patent Publication No. 2,048,501 issued on Sep. 13, 1994 to Robert P. Rainey, titled "Adaptable Hunting Stand For Ladder-Like Use Or A-Frame Use," describes a stand adapted for erection atop an all terrain vehicle or the like. As such, no means of attaching the device to a tree, separate foot rest and seating components, or seating is provided by Rainey.

None of the above inventions and patents, taken either singularly or in combination, is seen to describe the instant invention as claimed. Thus a tree stand with level adjustment solving the aforementioned problems is desired.

SUMMARY OF THE INVENTION

The present invention is a tree stand for use by hunters, observers and/or photographers of wild animals, or other persons who may have need for a reasonably comfortable and secure platform which may be temporarily and removably secured to a tree at some distance above the ground. The present stand includes means for ascending a tree, pole, or other suitable structure using no additional equipment other than the stand and the power of the person using the stand, and further, leveling means which is adjustable after the stand has been erected in the tree by the person using the stand while positioned in the stand.

The present tree stand has a lower or foot rest component and an upper or seating component. Each component comprises a generally rectangular frame, with the lower frame having a series of crossmembers for standing upon and the upper frame being essentially open for the hunter or animal observer to place his or her body therewithin. A blunt tree brace compression member extends from the rear of each frame and coplanar therewith, for bearing against the tree or pole. Each frame member includes a pair of upwardly and rearwardly sloped members from which a flexible tension member extends to wrap around the back of the tree.

Each tension member is secured within one of its respective sloped frame members by a laterally disposed pin on one side, which is adjustably installed through one of a series of pairs of holes in that sloped frame member. A corresponding loop is formed in the end of the tension member, through which the pin is inserted to hold that end of the tension member in place. The opposite end of the tension member comprises a loop formed through the eye of an eye bolt, with the threaded end of the eye bolt extending from a break in the end of the sloped member. A threaded knob is installed on the end of the eye bolt, and used for infinitesimally fine adjustment of the tension member length to adjust the level of each of the components precisely as desired. Additional features, such as adjustably positionable seating, foot rest and hand and arm rest extensions, etc., may be provided as desired.

Accordingly, it is a principal object of the invention to provide a tree stand for hunting, wildlife observation or photography, and/or other purposes where it is desired to be positioned at some distance above the ground with no intervening structure.

It is another object of the invention to provide such a tree stand comprising upper and lower frame components, with each frame component defining a plane and having a blunt, compressive tree brace member extending therefrom and coplanar therewith for bearing against the surface of a tree or pole, and a flexible tensile member extending from a structure above the frame for extending adjustably about the tree.

It is a further object of the invention to provide such a tree stand in which the flexible tensile member secures to the frame by means of opposite first and second sloped members extending from each side of the frame, with one end of the tensile member being secured by means of a pin selectively installed in a pair of a series of pairs of holes through one of the sloped members, and the opposite end of the tensile member being secured by means of an infinitesimally adjustable threaded member extending therefrom.

Still another object of the invention is to provide such a tree stand including selectively positionable seating means, a foot rest extension, and/or a hand and arm rest extension, as desired.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a tree stand for use by hunters, wildlife observers and photographers, and others who may have need for an elevated observation site which may be erected without need for tools or equipment. The present stand essentially comprises two components, with the user of the stand alternatingly working the two components up the tree (or pole, etc.) to set the stand up at the desired height on the tree or object. The present stand also includes means for leveling each component as desired after the stand has been set up in the tree without need for further tools, loosening or removal of any component from the tree, or otherwise jeopardizing the safety of the installation.

Figure 1:
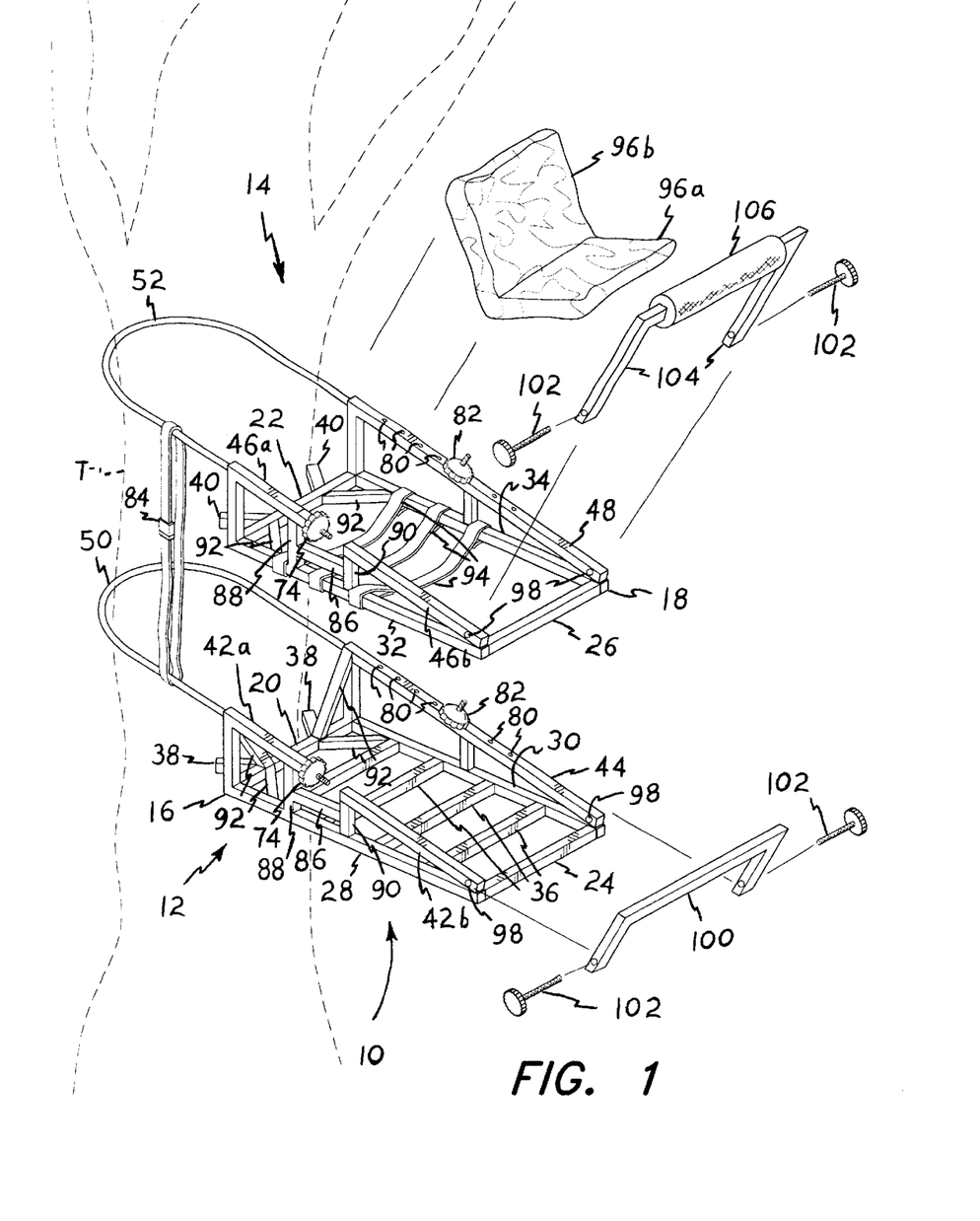
FIG. 1 is an exploded perspective view of the present tree stand, showing its installation to a tree and various accessories which may be provided therewith.

FIG. 1 of the drawings provides an exploded perspective view of the present stand 10 and supplementary accessories which may be provided with the two main components 12 and 14. The lower or foot support stand component 12 and the upper or seating component 14 are essentially similar, each having a peripheral frame, respectively 16 and 18, with the frames each defining respective lower and upper frame planes. Each frame 16 and 18 includes a peripheral tree contact end, respectively 20 and 22, and an opposite free end, respectively 24 and 26. The two ends 20, 24 and 22, 26 respectively of the lower component 12 and upper component 14 are joined by first and second side members, respectively 28 and 30 for the lower component 12 and 32 and 34 for the upper component 14.

The lower and upper components 12 and 14 differ only in that the lower component 12 includes an open grid formed by a series of laterally disposed foot stand braces 36 extending between the two side members 28 and 30 for supporting the weight of a person standing upon the lower component 12, while the frame 18 of the upper component 14 remains essentially open for seating, discussed further below. The structures of the lower and upper components 12 and 14 are preferably welded of a light weight but sturdy material, such as square or rectangular section aluminum alloy tubing. Such material provides a very light weight structure which may be easily carried on one's back for some distance, yet provides sufficient strength and rigidity for solid temporary attachment to a tree T or other object, generally as shown in FIG. 1 of the drawings. Suitable alternative materials may be used as desired.

The tree contact end 20 and 22 of each respective component 12 and 14 includes a pair of laterally spaced, generally diagonal tree compression brace members, respectively 38 for the lower component 12 and 40 for the upper component 14, extending therefrom. These brace members 38 and 40 serve to bracket the tree trunk T or pole diameter, etc. upon which the stand 10 is installed, to provide a secure installation for the stand components 12 and 14. The brace members 38 and 40 are coplanar with the peripheral frame plane of each frame 16 and 18, and are preferably formed of the same square or rectangular aluminum tubing as the upper and lower component stand members 12 and 14, and immovably affixed (preferably welded) thereto for a solid installation. The blunt surface of the brace members 38 and 40, along with their respective tree contact ends 20 and 22, result in a non-intrusive, impenetrable contact against the tree T or other object, to avoid damage to the tree T or object.

Each component 12 and 14 includes first upper side member sections, designated as separate sections 42a and 42b for the lower component 12 and 46a and 46b for the upper component 14. The opposite second side members are for each component 12 and 14 are unbroken, and are designated respectively as 44 and 48. These side members 42a through 48 are affixed (e. g., welded) to their respective first and second side members 28 through 34 at their respective free ends 24 and 26 thereof, and diverge upwardly from their respective first and second side members 28 through 34 to define a slope angle between each upper side member 42a through 48 and their respective first and second side members 28 through 34.

Figure 2:
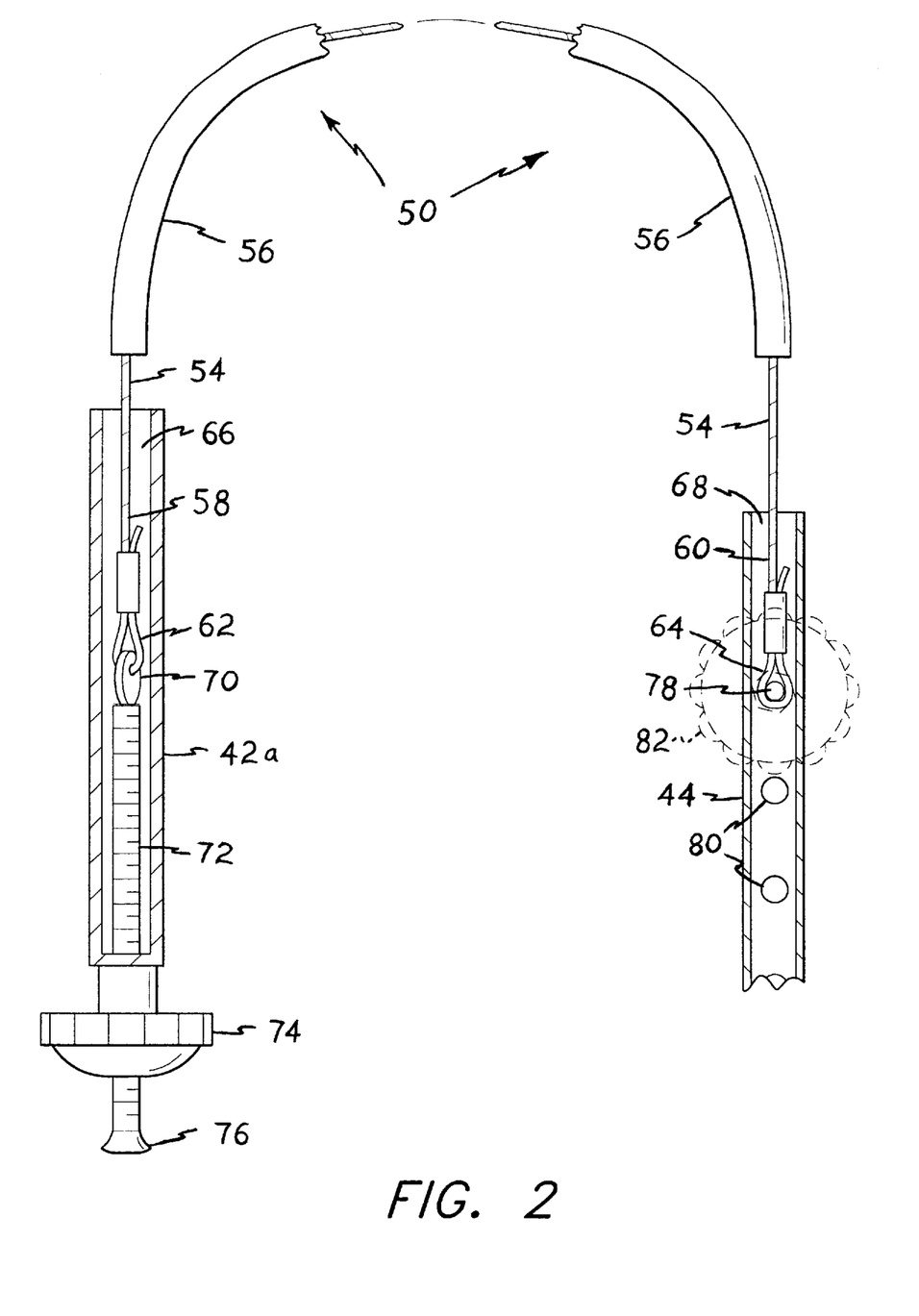
FIG. 2 is a top plan view of the leveling adjustment means for the tensile member provided with the upper and lower components of the present tree stand.

The upper side members 42a through 48 provide additional rigidity for their respective lower and upper components 12 and 14, and provide attachment of the upper tensile tree attachment members to the stand components 12 and 14 as well. These tree attachment members, respectively 50 and 52 for the lower component 12 and upper component 14, each comprise a flexible cable of high tensile strength covered by a relatively large diameter and compliant material, such as PVC tubing or the like, generally as illustrated in FIG. 2 and discussed in detail further below. The compliance of the sleeve material precludes any intrusion or penetration into the tree T, thereby protecting the tree T from damage.

The two tension members 50 and 52 extend around the back of the tree T when the components 12 and 14 are secured thereto, with the tension members 50 and 52 disposed somewhat above their respective compression braces 38 and 40 due to the upwardly diverging upper side members 42a through 48. This has the effect of producing a downward couple on each component 12 and 14, which is resisted by the rigidity of the tree T or other object to which the present stand assembly 10 is secured, thereby supporting the stand assembly 10 in the tree T or other object.

FIG. 2 of the drawings provides a detailed plan view of an exemplary tensile member, e. g., the lower tensile member 50. It will be understood that the upper tensile member 52 is identical to the lower tensile member 50, and the components and function described for the lower tensile member are equally applicable to the upper tensile member 52 and its accompanying upper side members.

In FIG. 2, the two upper side members 42a and 44 are illustrated with their upper portions broken away, in order to show clearly the attachment structure and adjustment means for the tensile tree attachment member of the lower component 12. The tension member 50 comprises a sturdy, flexible cable 54 having a flexible sheath or cover 56 (PVC tubing, rubber or plastic hose, etc.) applied thereover. This cable outer cover 56 provides some resilience even when relatively harder PVC plastics are used, to preclude penetration of the cable 54 into the surface of the tree T to which the present stand components 12 and 14 are secured. Such impenetrable attachment to the tree is not only preferred for protection of the environment, but is in fact required by law or regulation in many jurisdictions when tree stands are used.

The cable 54 has opposite first and second ends, respectively 58 and 60, with a first and a second loop 62 and 64 formed respectively at each end 58 and 60 by conventional means (swaged sleeve, etc.). The two cable ends 58 and 60, and their respective loops 62 and 64, are inserted into the hollow interiors 66 and 68 of the two rectangular tubular upper side members 42a and 44. The first cable end loop 62 passes through the eye 70 of a threaded spade bolt 72 which is installed concentrically within the hollow interior 66 of the first side member 42a, and captured therein by a mating threaded adjustment knob 74 at the outer end thereof. The bolt end 76 may be staked or otherwise worked to preclude removal of the adjustment knob 74 therefrom, after the knob 74 has been installed on the shank of the bolt 72.

The cable loop 64 of the opposite second end 60 of the cable 54 is removably installed in the hollow interior 68 of the second upper side member 44, with a threaded pin or bolt 78 being inserted through the second cable loop 64 to hold it in place within the second upper side member 44. A series of holes or passages 80 are provided through the opposed upper and lower walls of the second upper side member 44, through which the pin 78 may be selectively inserted. An actuating knob 82 (shown in broken lines in FIG. 2, for clarity in the drawing) is provided on the opposite end of the pin 78, allowing the user to secure the pin 78 in one of the selected passages 80 and remove the pin 78 therefrom as desired.

The multiple pin insertion passages 80 provided through the second upper side member 44, allow a user of the present stand assembly 10 to remove the second end 60 of the cable 54 from its attachment to the member 44, so the cable second end 60 may be passed around the tree T or other object to which the present stand is to be secured. The loop 78 of the cable second end 60 is again secured within the interior 68 of the second member 44 by installing the pin 78 therethrough, after aligning the cable end loop 78 with the desired hole or passage 80 in the second member 44. The series of holes or passages 80 provide a finite number of incremental adjustment settings for the second end loop 64 of the cable 54, as desired. The user of the present stand selects the hole or passage 80 by judging the approximate diameter of the tree T or other object to which the stand is to be secured, at the level at which the stand will be ultimately placed.

Once the cable 54 has been wrapped around the tree T or other object and secured within the second upper side member 44 as described above, with the other upper stand component 14 being secured about the tree or object in an identical manner, the hunter or user of the present stand assembly 10 may climb the tree or object using the stand assembly 10. This is done conventionally, by alternatingly removing one's weight from the upper and lower stand components 12 and 14 and lifting the free end 24 and 26 of the unburdened component 12 and 14 to release the pressures of the generally opposed compressive members 38 and 40 and their respective tensile cable members 50 and 52, thereby allowing each stand component 12 and 14 to be worked up the tree T or other object incrementally until reaching the desired level. A safety strap 84 (shown in FIG. 1) is preferably provided to link the stand components 12 and 14 loosely together, with an additional safety strap (not shown) preferably used to secure the hunter or user directly to the tree T or pole, etc. during the climb and occupation of the elevated stand 10.

Once the stand 10 assembly has been positioned at the desired height, the hunter or user may use the adjustment knob 74 of the first upper side member 42a (and/or 46a, for the upper stand component 14) to precisely adjust the level of each stand component as desired. The threaded adjustment provides a practically infinitely fine adjustment, with the mechanical advantage of the threaded mechanism allowing the user to make the adjustments easily even when weight is applied to the stand components 12 and 14.

Figure 3A:
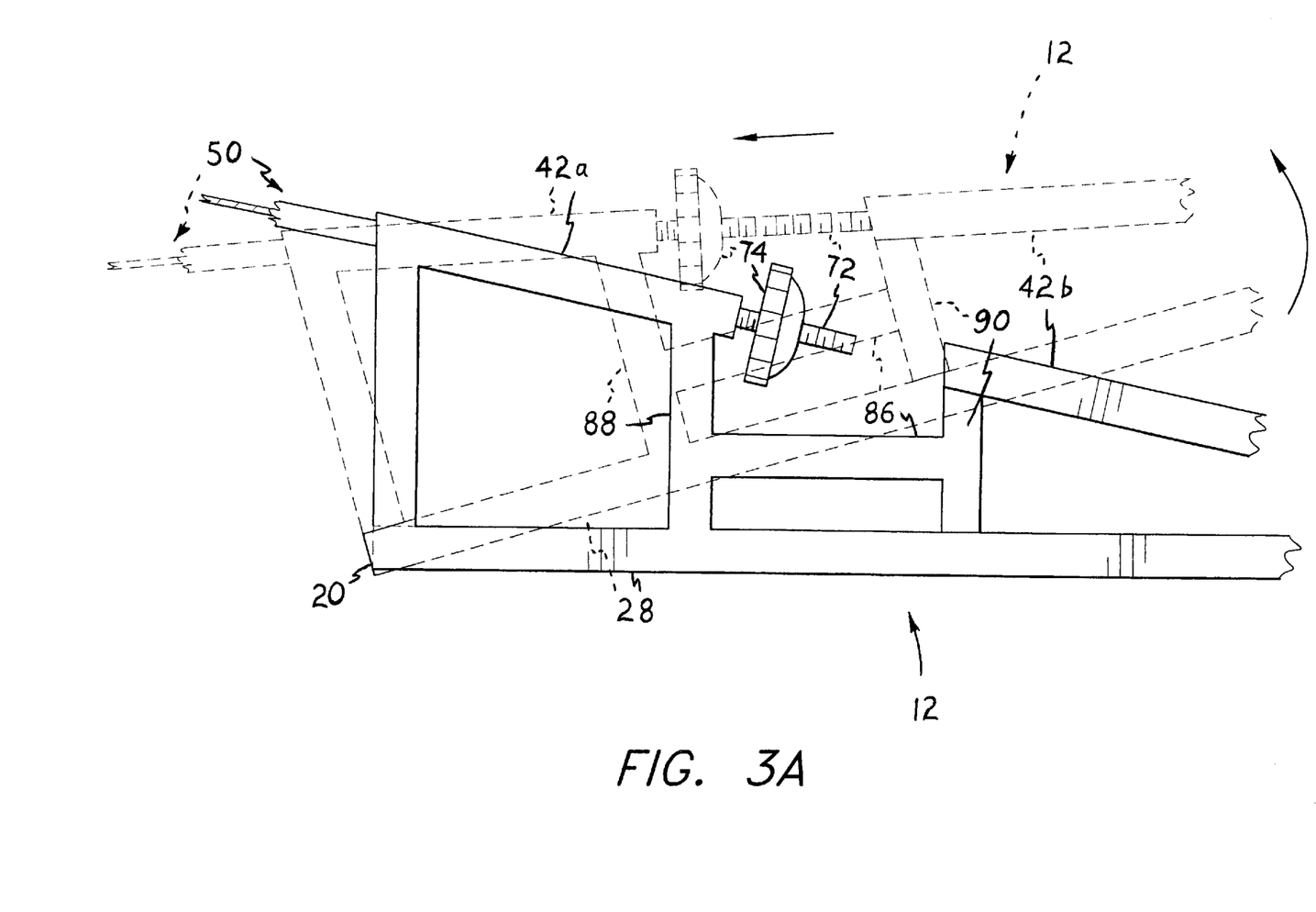
FIG. 3A is a side elevation schematic view of the infinitesimal threaded level adjustment means for the present tree stand, showing adjustment to an upwardly and rearwardly tilted position in broken lines.
Figure 3B:
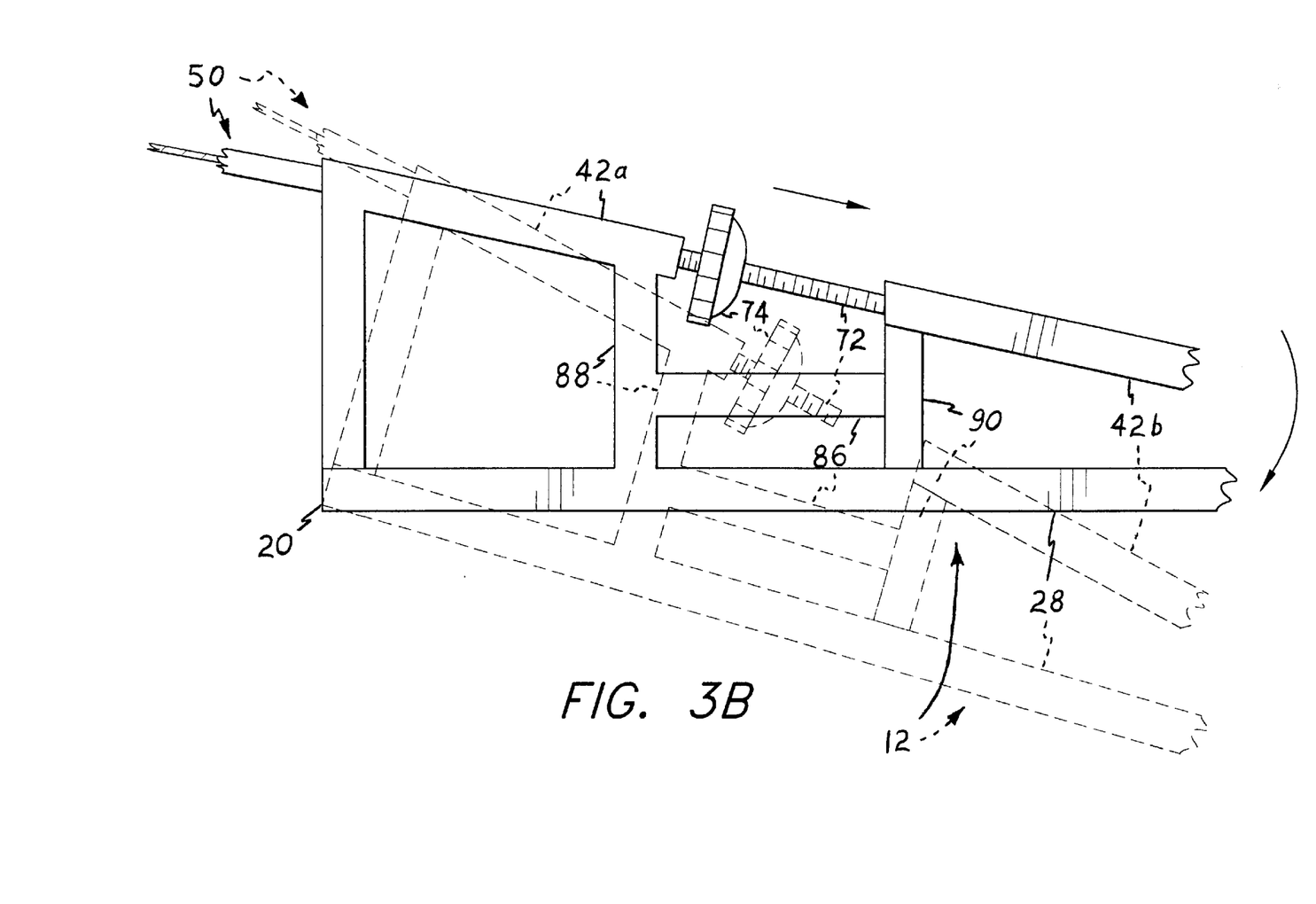
FIG. 3B is a side elevation schematic view of the infinitesimal threaded level adjustment means of FIG. 3A, showing adjustment to an downwardly and forwardly tilted position in broken lines.

FIGS. 3A and 3B of the drawings illustrate the operation of the threaded level adjustment of the present stand assembly 10. FIGS. 3A and 3B illustrate the procedure using the exemplary lower stand component 12, with its first lower side member 28 and upper side member sections 42a and 42b being visible in the side elevation views of FIGS. 3A and 3B. However, it will be understood that the mechanism and function for adjusting the level of the upper stand component 14 is identical to that shown in FIGS. 3A and 3B for the lower stand component 12 and described below.

FIG. 3A illustrates the procedure for raising the free end of the first stand component 12. In FIG. 3A, the level lower stand component 12 is shown in solid lines, with the free end of the stand 12 being raised after adjustment, as shown in broken lines. This adjustment is accomplished by turning the adjustment knob 74 clockwise (as viewed from its right side in FIGS. 3A and 3B, with right hand threads), which advances the spade bolt 72 through the threaded knob 74, outwardly from the right end of the upper side member 42a to draw the tension member 50 into the upper side member 42a. (The spade bolt 72 cannot rotate within the upper side member 42a, due to the width of the spade eye end 70 within the hollow member 42a, as shown in FIG. 2.) As the tension member 50 is fixed relative to its opposite pinned attachment end 60 in the second upper side member 44, the drawing of the first tension member or cable end 58 into the first upper side member 42a, has the effect of rotating the stand component 12 around its tree contact edge 20, thereby drawing the opposite free end upwardly, as shown.

FIG. 3B illustrates the procedure for lowering the free end of the stand component 12, by turning the adjustment knob 72 in a counterclockwise direction (as viewed from its right side in FIG. 3B). This allows more of the threaded spade bolt 72 to advance into the interior of the first upper side member 42a, thereby allowing the tension member 50 to extend from the opposite end of the upper side member 42a. Again, the component 12 rotates around its fulcrum defined by the contact of the tree contact end 20 of the component 12 with the tree or other object, allowing the free end of the component 12 to drop downwardly, as shown by the broken lines in FIG. 3B.

The actual process of leveling the stand component 12 (or 14, with the operation being identical to that described above for the stand component 12) would more likely begin with the component 12 at some angle other than horizontal, somewhat as shown by the broken line illustrations of the component 12 in FIGS. 3A and 3B. The hunter or user would then adjust the level of the component 12 by turning the knob 74 as desired, until the component 12 reached the level orientations illustrated in solid lines in FIGS. 3A and 3B. Alternatively, the hunter or user may wish to adjust the stand components 12 and/or 14 to some angle other than level, e. g., with either or both components tilted slightly back toward the tree T or other object to which the stand assembly 10 is secured. This is easily accomplished as desired, by adjusting the adjustment knob 74 as described above.

The relatively long length of the spade bolt 72 permits a wide range of level adjustment for the present stand components 12 and 14, particularly if the adjustment knob 74 is generally centered along the length of the bolt 72 prior to beginning adjustment. The hollow tubing from which the present stand components 12 and 14 are constructed, permits the free end of the bolt 72 to extend into the open end of the second upper side member section 42b as the knob 74 is tightened to draw up the bolt 72 and attached tension member 50. Thus, the only limits for level adjustment using the adjustment knob 74, are defined by the two ends 70 and 76 of the spade bolt 72, as shown in FIG. 2 of the drawings.

It will be seen that the adjustment knob 74 will actually bear against the adjacent end of the first upper side member segment 42a during operation and use of the stand, due to the tension applied to the cable tension member 50 while in use. However, the knob 74 is free to work back and forth in the open area between the two side member segments 42a and 42b, with the open area providing clearance for the installation and operation of the adjustment knob 74. Additional reinforcement of this area is provided by an offset reinforcement member 86, affixed (welded, etc.) in place between a pair of uprights 88 and 90. Additional reinforcement gussets 92 may be installed at various points in the stand components 12 and/or 14 as desired, e. g., adjacent the tree contact ends 20 and 22 of the respective stand components 12 and 14, and/or in other locations, as desired.

The present adjustable tree stand assembly 10 provides further advantages in addition to those described above. For example, the present stand also includes adjustably positionable seating for the hunter or other user of the device, as shown in FIG. 1 of the drawings. The upper or second stand component 14 has a relatively open area between the frame members 22, 26, 32, and 34, for clearance for the body of the user of the present stand assembly as he or she stands upon the foot brace supports 36 of the lower stand component 12.

This open area of the second component 14 may include a series of laterally disposed flexible straps or slings 94 installed across the two lower side members 32 and 34.

By providing conventional removable closures or attachments for the ends of the straps 94 (e. g., buckles, snaps, etc.), the straps 94 may be positioned anywhere desired along the two opposed lower side members 32 and 34 to provide seating as desired. In FIG. 1 of the drawings, the slings or straps are positioned relatively closer to the tree contact end 22 of the upper component 14, with a seat cushion 96*a* being provided for placement atop the straps 94 with the back 96*b* of the cushion resting against the tree T or other support. However, it will be seen that the straps 94 may be repositioned closer to the opposite free end 26 of the upper component 12, if so desired, to allow the hunter or user of the stand assembly 10 to be seated facing toward the tree T or other stand support if so desired. This may be desirable to use the tree T as a blind or camouflage, or for other purposes as desired.

The present stand assembly 10 may include additional refinements, as well. By providing suitable threaded passages 98 through the free ends of the two stand components 12 and 14, additional attachments may be removably installed as desired. In FIG. 1, a foot rest extension 100 is provided for removable attachment to the free end 24 of the first or lower stand component 12. The extension 100 may be constructed of a series of square aluminum tube lengths welded together, in the manner of the construction of the remainder of the stand components 12 and 14, or may be formed of alternate materials and techniques (e. g., bent tubular material, etc.) as desired. The foot rest extension 100 is attached to the free end 24 of the lower stand component 12 by a pair of threaded bolts or pins 102 having hand operable knobs or the like extending therefrom, to obviate any need for tools. Additional conventional locking means (keyways and keys, etc.) may be provided to preclude any undesired rotation of the foot rest 100 about the attachment bolts 102. The foot rest 100 provides convenient bracing and comfort for a person seated in the present stand assembly 10 after its erection in a tree T or other object.

A hand or arm rest 104 may be provided for removable attachment to the free end 26 of the upper or seating component 14 of the present stand 10, if so desired. The hand or arm rest 104 is constructed similarly to the foot rest 100, and is attached in the same manner. The hand or arm rest 104 may include padding or upholstery 106 thereon for greater comfort, and serves well as a rifle or camera support for steadying the aim of the user.

Figure 4:
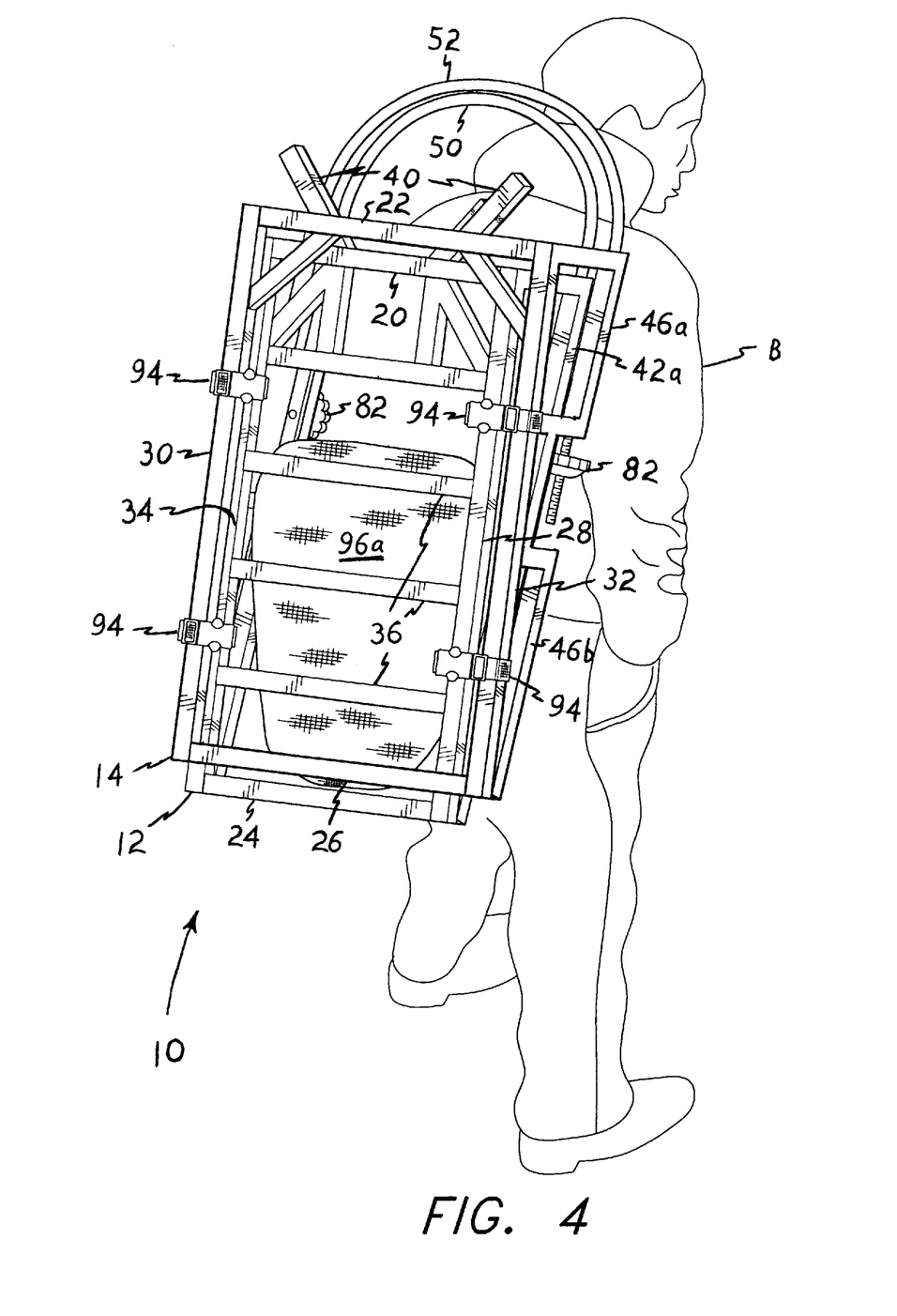
FIG. 4 is a rear perspective view of a backpacker carrying the present tree stand in its folded and nested configuration for backpacking.

The present tree stand assembly 10 is extremely versatile, and may be quickly and easily converted for backpacking carriage or compact storage as desired. FIG. 4 of the drawings provides an illustration of the folded configuration of the present stand assembly 10 for backpacking or other convenient and compact storage or transport. It will be seen that the lower or first stand component 12 is somewhat narrower than the second stand component 14, with the first component 12 nesting within the second component 14. The seating sling straps 94 may be removed from their in use positions across the side members 32 and 34 of the second component 14, and used to secure the first side members 28, 32 and 30, 34 respectively of the two stand components 12 and 14 together for carriage as an assembled unit. Alternatively, separate straps (not shown) may be provided for securing the two components 12 and 14 together, if so desired.

The safety strap 84 which is used to secure the two components 12 and 14 together during use may be used as a conventional backpacking harness or strap, if so desired. The conventional safety strap or harness (not shown) which is used to secure the hunter or user of the present stand assembly directly to the tree or other structure, may also be secured to the assembly 10 if so desired to provide for backpack carriage of the present stand assembly 10. The seat cushion 96*a* and/or 96*b* is conveniently fit between the assembly 10 and the back and/or shoulders of the backpacker B if so desired, for comfort of the backpacker B while carrying the present stand assembly 10.

In conclusion, the present tree stand assembly provides much needed versatility, security, and convenience over earlier devices of the related art. The structure of the present tree stand provides much improved rigidity and sturdiness over other such stands, by means of its welded aluminum construction. The solidity and rigidity of the present stand assure the user that the device may be erected quickly and easily in a tree or other support, with minimal noise and instability. The essentially unitary and monolithic nature of the welded structure of the present stand, obviates any working of adjacent parts and subsequent noise produced from such working, which tends to scare off game and other animals when using other stands.

This is particularly critical once the stand has been erected and the hunter, photographer or other user is positioned in the stand. Any subsequent movement, for changing the seating position or level, etc., can produce undesirable sounds, and perhaps even more importantly, can result in unstable situations. The present stand overcomes all of these various problems, by means of its solid, unitary construction and the ease and precision of level adjustment provided by the infinitesimally adjustable tension member of each stand component. The provision of a foot rest, hand and arm rest (or weapon or camera rest), and means for conveniently backpacking the present stand, provide further versatility and convenience which will prove most desirable for the hunter, wildlife photographer, or other outdoorsman who has need of a tree stand for providing an elevated position when in the field.

It is to be understood that the present invention is not limited to the embodiment described above, but encompasses any and all embodiments within the scope of the following claims.

I claim:

1. A tree stand with level adjustment for removably installing in a tree, comprising:

a lower foot stand component having a peripheral frame defining a lower frame plane;

an upper seating component having a peripheral frame defining an upper frame plane;

said lower component and said upper component each being formed of welded rectangular aluminum tube material, and having a tree contact end, a free end opposite said tree contact end, a first side member, and a second side member opposite said first side member;

an unadjustable, blunt compression brace extending from said tree contact end of each said component and coplanar therewith, for bearing impenetrably against the tree;

a flexible tensile tree attachment member disposed above said compression brace of each said component, for wrapping impenetrably about the tree;

each said tensile tree attachment member has a first end and a second end opposite said first end;

said first end of each said tree attachment member including infinitesimal continuous adjustment means for securing each said tree attachment member to a respective said component;

said second end of each said tree attachment member including finite, incremental adjustment means for securing each said tree attachment member to the respective said component;

each said first side member and each said second side member respectively having a first upper member and a second upper member affixed to said free end thereof and diverging upwardly therefrom to said tree contact end, and defining a slope angle between each said first side member and corresponding said first upper member and each said second side member and corresponding said second upper member;

said first end of each said tensile tree attachment member being adjustably secured within the corresponding said first upper member; and said second end of each said tensile tree attachment member being adjustably secured within the corresponding said second upper member.

2. The tree stand according to claim 1, further including adjustably positionable seating means disposed within said upper component.

3. The tree stand according to claim 1, further including:
 a foot rest extension removably installed upon said free end of said lower component; and
 a hand and arm rest extension removably installed upon said free end of said upper component.

4. The tree stand according to claim 1, further including an open grid comprising a plurality of lateral foot stand braces extending between said first side member and said second side member of said lower component, for supporting the weight of a person thereon.

5. The tree stand according to claim 1, further including:
 at least one safety strap removably connecting said upper component and said lower component;
 a plurality of adjustably positionable seating slings removably disposed across said first side member and said second side member of said upper component; and
 wherein said lower component is narrower than said upper component and nests therein for compact carriage, with said safety strap and said seating slings being convertible for securing said lower component within said upper component and for backpacking said lower and said upper component.

6. A tree stand with level adjustment for removably installing in a tree, comprising:
 a lower foot stand component having a peripheral frame defining a lower frame plane;
 an upper seating component having a peripheral frame defining an upper frame plane;
 said lower component and said upper component each having a tree contact end, a free end opposite said tree contact end, a first side member, and a second side member opposite said first side member;
 an unadjustable, blunt compression brace extending from said tree contact end of each said component and coplanar therewith, for bearing impenetrably against the tree;
 a flexible tensile tree attachment member disposed above said compression brace of each said component, for wrapping impenetrably about the tree;
 each said tensile tree attachment member including a first end and a second end opposite said first end;

said first end of each said tree attachment member including infinitesimal continuous adjustment means for securing said tree attachment member to a respective said component; and said second end of said tree attachment member including finite, incremental adjustment means securing said tree attachment member to the respective said component.

each said first side member and each said second side member respectively further comprises a first upper member and a second upper member affixed to said free end thereof and diverging upwardly therefrom to said tree contact end, and defining a slope angle between each said first side member and corresponding said first upper member and each said second side member and corresponding said second upper member, said first end of each said tensile tree attachment member being adjustably secured within the corresponding said first upper member and said second end of each said tensile tree attachment member being adjustably secured within the corresponding said second upper member.

7. The tree stand according to claim 6, further including adjustably positionable seating means disposed within said upper component.

8. The tree stand according to claim 6, further including:
 a foot rest extension removably installed upon said free end of said lower component; and
 a hand and arm rest extension removably installed upon said free end of said upper component.

9. The tree stand according to claim 6, further including an open grid comprising a plurality of lateral foot stand braces extending between said first side member and said second side member of said lower component, for supporting the weight of a person upon said lower component.

10. The tree stand according to claim 6, further including:
 at least one safety strap removably connecting said upper component and said lower component;
 a plurality of adjustably positionable seating slings removably disposed across said first side member and said second side member of said upper component; and
 wherein said lower component is narrower than said upper component and nests therein for compact carriage, with said safety strap and said seating slings being convertible for securing said lower component within said upper component and for backpacking said lower and said upper component.

11. A tree stand with level adjustment for removably installing in a tree, comprising:
 a lower foot stand component having a peripheral frame defining a lower frame plane;
 an upper seating component having a peripheral frame defining an upper frame plane;
 said lower component and said upper component each having a tree contact end, a free end opposite said tree contact end, a first side member, and a second side member opposite said first side member;
 said lower component and said upper component each being formed of welded rectangular aluminum tube material;
 said lower component further including an open grid comprising plurality of lateral foot stand braces extending between said first side member and said second side member, for supporting the weight of a person upon said lower component;
 an unadjustable, blunt compression brace extending from said tree contact end of each said component and coplanar therewith, for bearing impenetrably against the tree; and a flexible tensile tree attachment member disposed above said compression brace of each said component, for wrapping impenetrably about the tree;

each said tensile tree attachment member has a first end and a second end opposite said first end;

said first end of each said tree attachment member including infinitesimal continuous adjustment means for securing each said tree attachment member to a respective said component; and said second end of each said tree attachment member including finite, incremental adjustment means for securing each said tree attachment member to the respective said component;

each said first side member and each said second side member respectively further comprises a first upper member and a second upper member affixed to said free end thereof and diverging upwardly therefrom to said tree contact end, and defining a slope angle between each said first side member and corresponding said first upper member and each said second side member and corresponding said second upper member, said first end of each said tensile tree attachment member being adjustably secured within the corresponding said first upper member and said second end of each said tensile tree attachment member being adjustably secured within the corresponding said second upper member.

12. The tree stand according to claim 11, further including adjustably positionable seating means disposed within said upper component.

13. The tree stand according to claim 11, further including:

a foot rest extension removably installed upon said free end of said lower component; and a hand and arm rest extension removably installed upon said free end of said upper component.

14. The tree stand according to claim 11, further including:

at least one safety strap removably connecting said upper component and said lower component;

a plurality of adjustably positionable seating slings removably disposed across said first side member and said second side member of said upper component; and wherein said lower component is narrower than said upper component and nests therein for compact carriage, with said safety strap and said seating slings being convertible for securing said lower component within said upper component and for backpacking said lower and said upper component.

\* \* \* \* \*